Aug. 19, 1924.

C. ALLEN 1,505,685

LAWN TRIMMER

Filed April 9, 1921

Inventor:
Clarence Allen.
By Howard Fick
his Attorney.

Patented Aug. 19, 1924.

1,505,685

UNITED STATES PATENT OFFICE.

CLARENCE ALLEN, OF MASON CITY, IOWA.

LAWN TRIMMER.

Application filed April 9, 1921. Serial No. 459,884.

*To all whom it may concern:*

Be it known that I, CLARENCE ALLEN, a citizen of the United States, residing at Mason City, county of Cerro Gordo, and State of Iowa, have invented a new and useful Improvement in Lawn Trimmers, of which the following is a specification.

My invention relates to lawn trimmers for straightening the edge of a lawn along a desired line or adjacent the edge of a walk, of the type adapted to remove a portion of the sod along said line or walk so as to leave a groove of uniform depth and width for preventing the grass from growing over the side walk or for terminating the sod in an abrupt line. An object of my invention is to provide a lawn trimmer of this type having a depending cutter provided with a handle for manipulating the same together with means for adjusting the depth of the cut relative to the surface of the lawn.

Another object of the invention is to provide means for simultaneously cleaning the sidewalk after the cutter has made the required furrow.

In carrying out my objects I provide a share having a curved portion, said share being provided with oppositely positioned cutting edges and having mounted on the side-walk side a wheel and on the lawn side a shoe which rests upon the lawn. A handle attached to this share provides means for pushing the device while a brush attached to the rear end thereof serves to clean up the side-walk as the lawn trimmer is operated.

The full objects and advantages of my invention will appear in connection with the detailed description thereof and are particularly pointed out in the claims.

In the drawings, illustrating the application of my invention in one form:—

Figure 1:
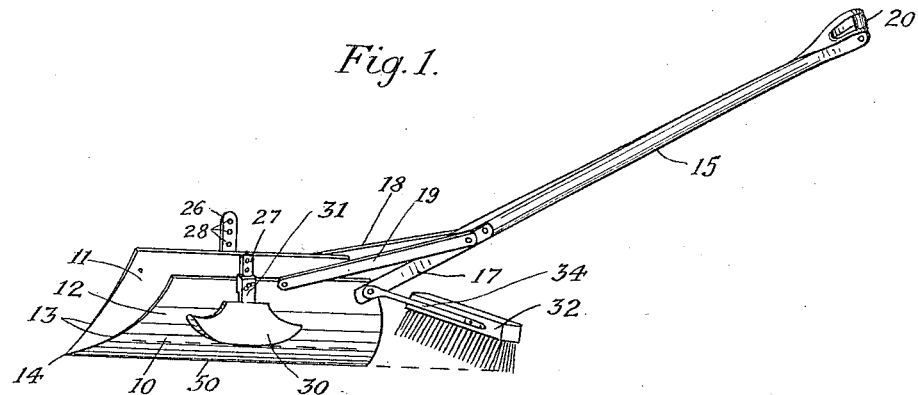
Fig. 1 is a perspective view of my invention.
Figure 2:
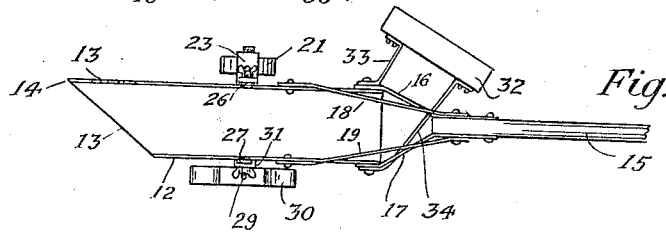
Fig. 2 is a plan view of the device shown in Figure 1.

My invention as best shown in Figure 1 comprises a share 10 which is constructed from a single piece of flat metal formed with a straight side 11 and a concave side 12 which meet in a straight line as indicated at 50. Member 11 is formed with a straight side to provide a guiding surface adapted to slide against the edge of the walk during the operation of cutting the trench so that when the device is placed against the edge of the walk the cutting share 10 will cut close against the latter as the trimmer is operated. The forward end of share 10 is provided with bevel cutting edges 13 constructed for cutting the dirt or the sod while the device is pushed along the ground. These edges 13 are curved inwardly terminating in a sharp point 14 with the edge on member 12 inclined obliquely and rearwardly as indicated in Figure 2. By shaping the cutter in this manner the device has a tendency to dig downwardly into the sod so as to cut the sod and dirt with the greatest ease.

Figure 3:
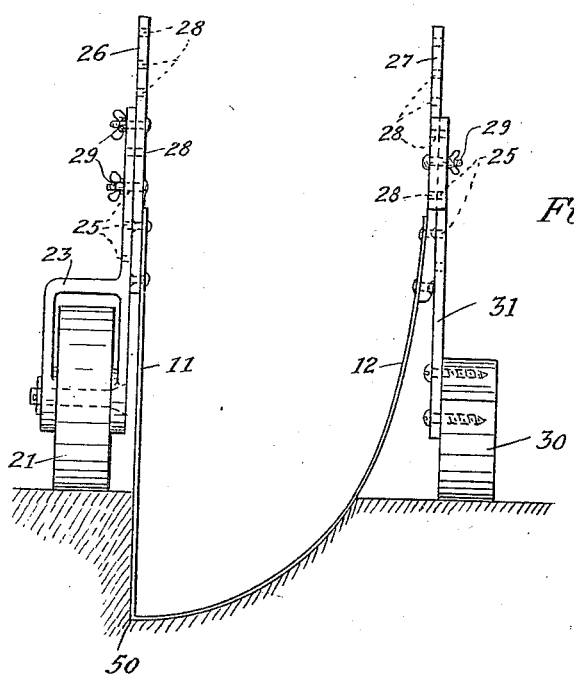
Fig. 3 is an end view of the device shown in Figure 2 drawn to a larger scale and with certain parts omitted.

For operating the trimmer I provide a handle 15 which is formed with two forked portions 16 and 17 at its lower end attached respectively to the shares 11 and 12 as indicated in Figure 2. A pair of brace members 18 and 19 are riveted to the handle 15 and are also secured to the shares 11 and 12 near their upper surfaces thus firmly holding handle 15 attached to both of these shares in fixed relation thereto. Handle 15 is further provided with a hand grasping portion 20 by means of which the device is manipulated. It can be clearly seen that by pushing on handle 15 that the cutting edges 13 of the share 11 and 12 will dig into the sod making a furrow as is clearly indicated in Figure 3.

For regulating the depth of the cut I provide a wheel 21 which is journaled in a socketed bracket 23 provided with a plurality of holes 25. This bracket is adapted to be bolted to an upright 26 riveted to the share 11 and 12 near the middle portions thereof by means of a bolt 29 passing through the hole 25 in said bracket 23 and through a corresponding number of holes 28 in said upright. In a similar manner I provide a shoe 30 which is attached to a bracket 31. Bracket 31 is similarly provided with a number of holes 25 which are adapted to register with a corresponding number of holes 28 formed in an upright 27 mounted on the share 12 opposite the upright 26 previously mentioned. A bolt 29 serves to hold bracket 31 in place upon the upright 27 similar to the wheel supporting device on the opposite side of the invention. By means of the holes 28 and 25 in the uprights 26 and 27 and the brackets 23 and 31 the positioning of the wheel 21 and shoe 30 relative to the bottom line 50 of the plow share 10 may be varied at will so that the size of the furrow or ditch cut by the device may be adjusted to suit the particular requirements.

It can readily be seen that although I have shown a shoe on one side and a roller on the other that if desired either shoe or wheels may be used on both sides, although I find it will work better if arranged as indicated.

For removing the cuttings made by the trimmer and for cleaning the sidewalk after the trimmer has been operated, I provide a brush 32 which has securely riveted to it two arms 33 and 34 which are pivoted to the forked portions 16 and 17 of handle 15 at their place of attachment to the shares 11 and 12. Brush 32 is free to oscillate upwardly and downwardly and is adapted to clean the sidewalk to the rear of the device as the same is moved along the edge of the walk. It will be seen that a portion of the earth removed will be caught in between the share members 11 and 12 and may be directly removed by lifting the entire device through handle 15 and disposing said sod or earth wherever desired.

The advantages of my invention are manifest. The cutting edges of the share are so arranged as to cause the share to dig down into the ground and so always make the depth of cut desired which is determined by the portion of the wheels or shoes provided for that purpose. The exact shape of the cutting edges and the relative inclination to one another of the share proper provides an effective device for making a sharp and clean cut. The handle of the device being rigidly connected to the share makes it a substantial and rigid construction which may be easily manipulated and which may be bodily lifted to remove the cuttings within the same.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. A lawn trimmer comprising a share having a vertical side, a concave side meeting said vertical side in a single line, cutting edges formed on the forward ends of said share, uprights attached to both of said share sides, ground engaging devices mounted on each of said uprights for limiting the depth of the cut of said cutting edge, and means for adjustably attaching said ground engaging device to the uprights.

2. A lawn trimmer comprising a share having a curved side and a straight side open at the top throughout its length, independent vertical guides attached to the two share sides, being separate at the top and ground engaging members mounted on said guides.

3. A lawn trimmer comprising a share having a curved side and a straight side open at the top throughout its length, supporting members fastened to each of said share sides, said supporting members being separated at the top, a shoe fastened to one of said supporting members, and a wheel fastened to the other of said supporting members.

4. A lawn trimmer comprising a share having a curved side, and a straight side, open at the top throughout its length, a vertical guide secured to the straight side near the center thereof; a second vertical guide secured to the curved side in substantially parallel relation thereto and ground engaging members adjustably attached to said guides.

5. A lawn trimmer comprising a cutting member, a handle secured thereto, a support pivotally attached to said cutting member, a brush mounted upon said support, said support being arranged to swing upon its point of pivot as the device is operated to cause the brush to follow along the surface upon which it rests.

6. In combination with a lawn trimmer having a cutting member, a handle extending rearwardly of said cutting member and a brush positioned rearwardly of said cutting member in oblique relation thereto.

7. A lawn trimmer adapted to remove the sod adjacent a sidewalk comprising a cutting member, a handle for operating said cutting member and a cleaning member attached to said device adapted to extend over said sidewalk and to remove all the earth falling thereon and distributing the same back to the lawn.

8. A lawn trimmer comprising a cutting share, a handle, a forked brace for attaching said handle to said share, and means secured to said forked handle attaching member for pivotally supporting a cleaner in oblique relation to said share.

9. In combination with a lawn trimmer having a cutting member, adjustable ground engaging members connected therewith for varying the depth of cut of said cutting member, an arm pivotally connected to said cutting member and a sidewalk cleaning member secured to said arm and adapted to swing therewith to clean the sidewalk irrespective of the depth of cut of said cutter.

In testimony whereof I affix my signature.

CLARENCE ALLEN.